Figure 1:
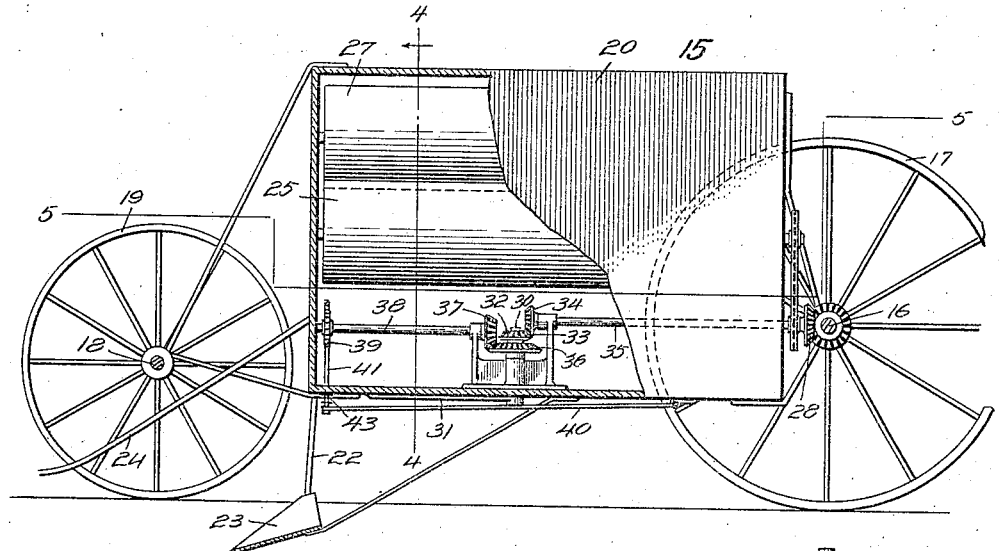
Figure 5:
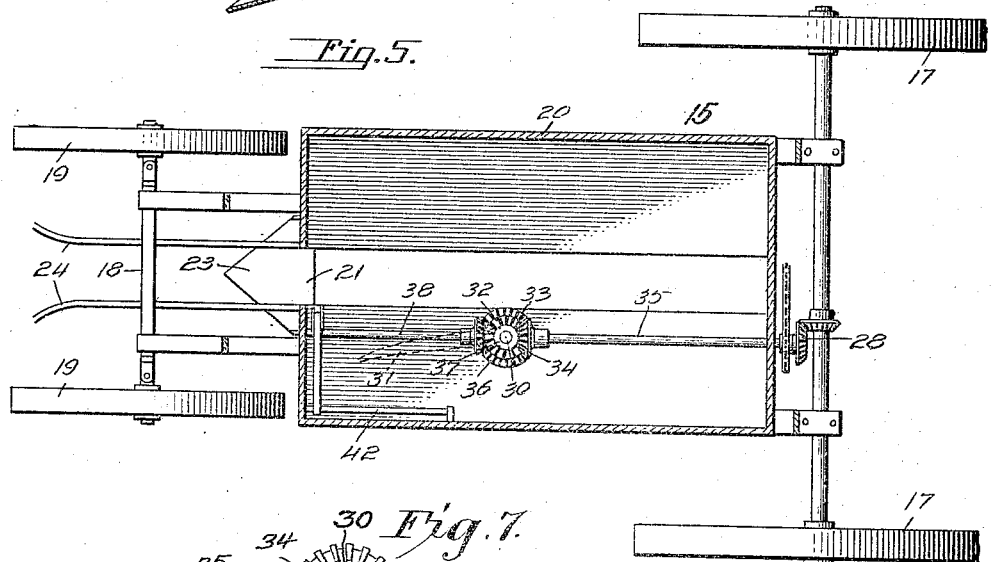
Figure 7:
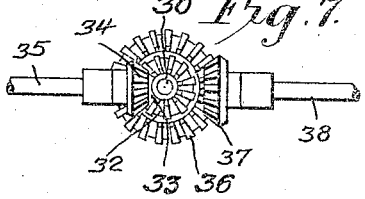
Figure 2:
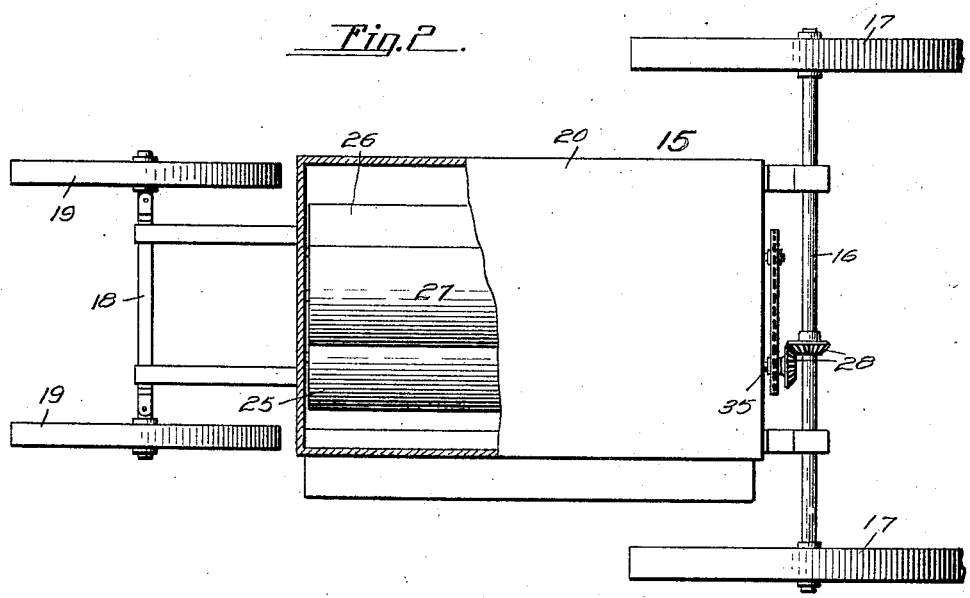
Figure 6:
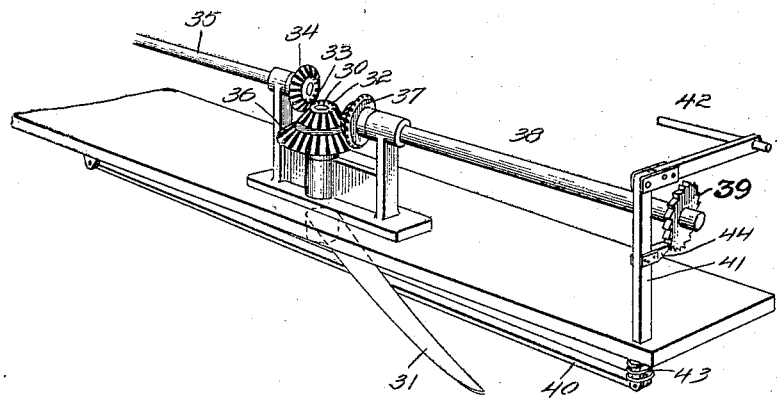
Figure 3:
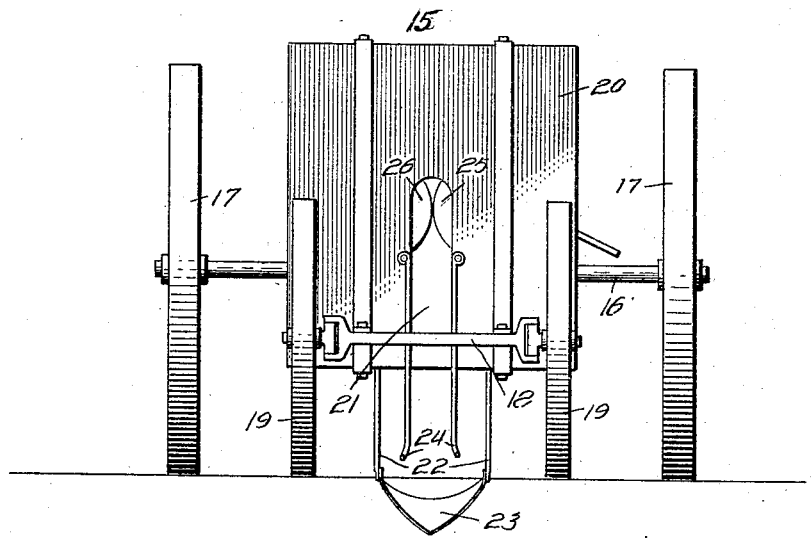
Figure 4:
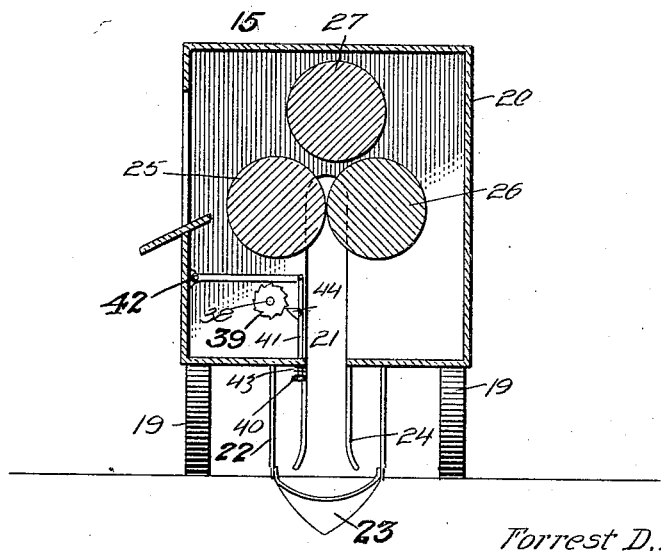

F. D. KEITH.
BEET HARVESTER.
APPLICATION FILED MAY 11, 1918.

1,304,486.

Patented May 20, 1919.
3 SHEETS—SHEET 1.

Witnesses
F. C. Gibson.

Inventor
Forrest D. Keith.

By Victor J. Evans
Attorney

F. D. KEITH.
BEET HARVESTER.
APPLICATION FILED MAY 11, 1918.

1,304,486.

Patented May 20, 1919.
3 SHEETS—SHEET 2.

Witnesses
F. C. Gibson.

Inventor
Forrest D. Keith.
By Victor J. Evans
Attorney

F. D. KEITH.
BEET HARVESTER.
APPLICATION FILED MAY 11, 1918.

1,304,486.

Patented May 20, 1919.
3 SHEETS—SHEET 3.

Witnesses
F. C. Gibson

Inventor
Forrest D. Keith
By Victor J. Evans
Attorney